Patented June 30, 1925.                                                                 1,544,030

UNITED STATES PATENT OFFICE.

RENÉ OPPENHEIM, OF LEVALLOIS-PERRET, FRANCE, ASSIGNOR TO SOCIÉTÉ ANONYME
LE CARBONE, OF LEVALLOIS-PERRET (SEINE), FRANCE.

PROCESS FOR RENDERING POROUS ELECTRODES IMPERMEABLE TO LIQUIDS.

No Drawing.          Application filed October 19, 1923.   Serial No. 669,625.

*To all whom it may concern:*

Be it known that I, RENÉ OPPENHEIM, of 12 and 33 Rue de Lorraine, Levallois-Perret, Seine, France, engineer, have invented Processes for Rendering Porous Electrodes Impermeable to Liquids, of which the following is a full, clear, and exact description.

The present invention has for its object a process for rendering impermeable to liquids the porous bodies of electrodes used in certain types of batteries, as well as those used in certain electrolyzing apparatuses, without altering the properties of the electrodes as to permeability to or absorption of gases, and while preserving or imparting to the electrodes a good electric conductivity.

This process is characterized, in principle, by the application, upon the porous body of the electrode, of a metallic soap such as a metallic oleo-margarate (the oleo-margarate of zinc, for example) which has the property of forming upon the porous body a colloidal pectized film, which is non-decomposable by an electric current, is a good conductor of electricity and is impermeable to liquids but permeable to gases.

The term " metallic soap " as used herein, is intended to cover compounds of metals with the fatty acids, which are insoluble in water but generally more or less soluble in oily materials.

This metallic soap may, for example, be prepared as follows:

In a litre of water, preferably boiling, there is dissolved 100 grammes of high grade white soap (such as Marseille soap), then this solution is mixed when cold with a solution of chloride of zinc titrating about 40° Baumé. There is thus obtained a precipitate of ole-margarate of zinc or soap of zinc.

This precipitate, obtained after filtration, is spread by means of a spatula, for example, upon the porous body, and thus forms upon it a colloidal pectized film, constituting a protective facing, which has the following properties:—it is insoluble in water, impermeable to liquids, permeable to gases, non-decomposable by electric current, and a good conductor of electricity.

This facing, which is chiefly adapted to be applied to the porous depolarizing carbon of the positive electrode of certain types of batteries, protects this porous carbon against access of water from the electrolyte, and at the same time preserves for the battery a low internal resistance, on account of the excessively small thickness of the colloidal pectized film and of its electric conductivity.

The pectized colloid of metallic oleo-margarate may also be formed by the immersion of the porous body the following conditions:

The porous body is at first immersed in the solution of white soap, preferably boiling. The immersion should be carried out rapidly in such a way that the liquid has no time to deeply penetrate into the mass. After immersion, the porous body is allowed to dry for several seconds, and is then immersed in the solution of the metallic salt, which may, for example, be chloride of zinc.

By the re-action of the chloride of zinc on the soap, oleo-margarate of zinc, or soap of zinc is formed within the pores of the peripheral part of the porous body, which is thereby protected against outside shocks, and slight scratches. Thus perfect impermeability is obtained opposing any penetration of the liquid into the mass of the porous body.

Claims:

1. A process for rendering porous electrodes impermeable to liquids, which comprises applying a metallic soap to the porous electrode, so that said soap forms on this porous body a colloidal pectized film, which is non-decomposable by electric current, is a good conductor of electricity, and is impermeable to liquids but permeable to gases.

2. A process for rendering porous electrodes impermeable to liquids, which comprises applying to the porous electrode a metallic oleo-margarate, so that the latter forms on this porous body a colloidal pectized film, which is non-decomposable by electric current, is a good conductor of electricity, and is impermeable to liquids but permeable to gases.

3. A process for rendering porous electrodes impermeable to liquids, which comprises applying to the porous electrode an oleo-margarate of zinc, so that the latter forms on this orous body a colloidal pectized film, which is non-decomposable by electric current, is a good conductor of electricity, and is impermeable to liquids but permeable to gases.

4. A process for rendering porous electrodes impermeable to liquids, which comprises dipping the porous body in a solution of white soap for a very short time, in allowing the porous body to dry for several seconds after this dipping, and in then dipping the body in a solution of a metallic salt.

5. A process for rendering porous electrodes impermeable to liquids, which comprises dipping the porous body in a solution of white soap for a very short time, in allowing the porous body to dry for several seconds after this dipping, and in then dipping the body in a solution of zinc chloride.

The foregoing specification of my "process for rendering porous electrodes impermeable to liquids," signed by me this 5th day of October, 1923.

RENÉ OPPENHEIM.